US008140964B2

(12) United States Patent
Cragun et al.

(10) Patent No.: US 8,140,964 B2
(45) Date of Patent: *Mar. 20, 2012

(54) ANNOTATION VALIDITY USING PARTIAL CHECKSUMS

(75) Inventors: Brian J. Cragun, Rochester, MN (US); William C. Rapp, Rochester, MN (US)

(73) Assignee: International Business Machines Corporation, Armonk, NY (US)

(*) Notice: Subject to any disclaimer, the term of this patent is extended or adjusted under 35 U.S.C. 154(b) by 967 days.

This patent is subject to a terminal disclaimer.

(21) Appl. No.: 12/113,079

(22) Filed: Apr. 30, 2008

(65) Prior Publication Data

US 2008/0209310 A1 Aug. 28, 2008

Related U.S. Application Data

(63) Continuation of application No. 10/310,192, filed on Dec. 4, 2002, now Pat. No. 7,392,267.

(51) Int. Cl.
*G06F 17/00* (2006.01)

(52) U.S. Cl. .......................... 715/230; 715/229; 715/255

(58) Field of Classification Search .......... 715/230–233, 715/254–255, 229
See application file for complete search history.

(56) References Cited

U.S. PATENT DOCUMENTS

| | | | |
|---|---|---|---|
| 4,807,182 A | 2/1989 | Queen | |
| 5,253,362 A | 10/1993 | Nolan et al. | |
| 5,309,359 A | 5/1994 | Katz et al. | |
| 5,974,574 A | 10/1999 | Lennie et al. | |
| 6,088,707 A * | 7/2000 | Bates et al. | 715/235 |
| 6,092,204 A | 7/2000 | Baker | |
| 6,219,818 B1 | 4/2001 | Freivald et al. | |
| 6,272,488 B1 | 8/2001 | Chang et al. | |
| 6,335,738 B1 | 1/2002 | Englefield et al. | |
| 6,342,906 B1 | 1/2002 | Kumar et al. | |
| 6,366,933 B1 | 4/2002 | Ball et al. | |
| 6,393,438 B1 | 5/2002 | Kathrow et al. | |
| 6,470,306 B1 | 10/2002 | Pringle et al. | |
| 6,596,030 B2 | 7/2003 | Ball et al. | |
| 6,658,626 B1 | 12/2003 | Aiken | |
| 6,803,927 B1 | 10/2004 | Sahoo | |
| 6,910,188 B2 * | 6/2005 | Keohane et al. | 715/751 |
| 7,392,267 B2 * | 6/2008 | Cragun et al. | 1/1 |
| 7,689,578 B2 * | 3/2010 | Albornoz et al. | 715/230 |
| 7,712,030 B1 | 5/2010 | Blau et al. | |

(Continued)

OTHER PUBLICATIONS

Office Action History for U.S. Appl. No. 10/310,192 from Jun. 30, 2005 to May 15, 2008.

(Continued)

*Primary Examiner* — Thu Huynh
(74) *Attorney, Agent, or Firm* — Patterson & Sheridan LLP

(57) ABSTRACT

Embodiments of the present invention generally provide a system, method and article of manufacture for validating annotations describing one or more portions of a data object. In general, prior to displaying a requested annotation, a current change detection value may be calculated from current data extracted from portions of the data object described by the annotation. The current change detection value may be compared to a previously saved change detection value calculated from data extracted from the portions of the data object at the time the annotation was generated. A mismatch in the current change detection value and the previously saved change detection value indicates a change in the annotated portions of the data object, which may render the annotation invalid. The annotated portions of the data object may be continuous or discontinuous.

17 Claims, 7 Drawing Sheets

U.S. PATENT DOCUMENTS

| | | |
|---|---|---|
| 2002/0124018 A1 | 9/2002 | Fifield et al. |
| 2002/0154120 A1* | 10/2002 | Cullimore et al. ............ 345/441 |
| 2002/0171670 A1 | 11/2002 | Clernock et al. |
| 2003/0145281 A1* | 7/2003 | Thames et al. ................ 715/513 |
| 2003/0177175 A1 | 9/2003 | Worley et al. |
| 2003/0204570 A1 | 10/2003 | Rehof et al. |
| 2004/0075686 A1 | 4/2004 | Watler et al. |
| 2004/0111668 A1 | 6/2004 | Cragun et al. |
| 2004/0205076 A1 | 10/2004 | Huang et al. |
| 2004/0205542 A1 | 10/2004 | Bargeron et al. |
| 2004/0205577 A1 | 10/2004 | Abe et al. |
| 2004/0210833 A1 | 10/2004 | Lerner et al. |
| 2005/0060162 A1 | 3/2005 | Mohit et al. |
| 2005/0061062 A1 | 3/2005 | Kaneko et al. |
| 2006/0080598 A1 | 4/2006 | Bargeron et al. |
| 2006/0143559 A1 | 6/2006 | Spielberg et al. |
| 2008/0072135 A1* | 3/2008 | Cragun et al. ................ 715/230 |

OTHER PUBLICATIONS

Office Action for U.S. Appl. No. 11/944,987 dated Oct. 14, 2010.

* cited by examiner

600

REQUESTED ANNOTATION IS NOT VALID
DUE TO A CHANGE IN ANNOTATED DATA

PLEASE CHOOSE ONE OF THE FOLLOWING OPTIONS:

⊙ UPDATE ANNOTATION RECORD TO REFLECT CURRENT DATA

○ EDIT ANNOTATION

○ DELETE ANNOTATION

| OK | CANCEL |

ANNOTATION VALIDITY USING PARTIAL CHECKSUMS

CROSS-REFERENCE TO RELATED APPLICATIONS

This application is a continuation of U.S. patent application Ser. No. 10/310,192, filed Dec. 4, 2002 now U.S. Pat. No. 7,392,267, which is herein incorporated by reference in its entirety.

BACKGROUND OF THE INVENTION

1. Field of the Invention

The present invention generally relates to annotating data objects and, more particularly, to determining the validity of annotations by detecting changes in the annotated data.

2. Description of the Related Art

An annotation system is one where descriptive information is stored about objects, or parts of objects. Some annotation systems store annotations separately, without modifying the objects themselves. An annotation store, typically a database, contains information for the annotation, typically in the form of descriptive text, or other classifiers. An indexing scheme is typically used to map each annotation to the object or positions of annotated portions within the object. The annotation system may be configured to display the annotation in response to the user selecting the annotated portions of the object. For example, one common method for displaying annotations is in a flyover text box generated when a user positions a mouse pointer in proximity to the annotated portion or portions of the object.

The annotations themselves may serve different functions for different applications. For example, for some applications, annotations may serve as an interactive help system, providing description of the functionality, or explain the use of the annotated object. As an example, in a business application, an annotation may explain the use of an economic performance parameter, such as a current year's revenue by division. For other applications, annotations may serve to provide expert feedback, comments, or clarifications from a reviewer or a creator of a document or other data object. As examples, the creator of a document may insert an annotation highlighting the relevance of a certain piece or group of data, while a reviewer of the same document may insert an annotation with instructions for revising the document, possibly to correct an error.

In many instances, however, the annotation system and an application used to create or modify the annotated object may act independently. Thus, the annotated object may change without the permission, or foreknowledge of the annotation system. As a result, annotations that were valid prior to a change may no longer be valid after the change. Using the example above, the creator of the document may correct an error as suggested in the reviewer's annotation without updating (or deleting) the annotation. Thus, the annotation invalidly refers to an error that has already been corrected, which may mislead a future viewer of the annotation.

Conventional methods for detecting changes to a data object typically involve calculating a checksum for the data object. In general, a checksum is a numerical value generated by an algorithm performed on each bit in the data object. The algorithm is designed so that a change to even a single bit in the data object results in a new checksum. Thus a change in the data object may be detected by comparing checksums generated for the data object at different points in time. A mismatch in the checksum indicates a change occurred somewhere in the data object.

However, an annotation typically only refers to a portion or set of portions of the object. Accordingly, it is possible for annotations referring to parts of an object that have not changed to remain valid, even when other parts of the data object have changed. As an example, in an array or matrix of data (such as a spreadsheet), an annotation may be made for a cell, a row, a column, a group of columns, or any discontinuous group of data points. A change to other data in the array (not referenced by the annotation) would not invalidate the annotation. As another example, in a text document where annotations are made on a paragraph, a change to another paragraph later in the document (or addition of a paragraph) would not change the validity of the annotation on the earlier paragraph. Because conventional methods for detecting a change to a data object typically generate a checksum for the entire data object, a mismatch in checksums indicates a change in the data object as a whole, but not what portion was changed.

Therefore, conventional checksum methods applied to an entire data object are too general and thus inadequate for determining the validity of an annotation referring to a specific portion of the data object. Accordingly, a method is needed to validate an annotation referring to a specific portion of a data object by detecting whether the specific annotated portion has changed since the annotation was created.

SUMMARY OF THE INVENTION

The present invention generally is directed to a method, system and article of manufacture for validating annotations associated with one or more portions of a data object.

One embodiment provides a method for annotating a data object. The method generally includes creating an annotation for one or more portions of a data object, calculating at least a first change detection value on data extracted from the one or more portions, and creating an annotation record containing the first change detection value and the annotation. The method may further comprise, upon receiving a request for the generated annotation, calculating a second change detection value on data extracted from the one or more portions after receiving the request for the annotation, comparing the second change detection value to the first change detection value, and providing an indication that the one or more portions of data have changed in response to determining the second change detection value and first change detection value do not match.

Another embodiment provides a method for determining validity of an annotation. The method generally includes calculating a current change detection value for data extracted from one or more portions of a data object referenced by the annotation, comparing the current change detection value to a previous change detection value calculated for data extracted from the one or more portions and, if the current and previous change detection values do not match, providing an indication to a user that the annotation is possibly invalid due to a change in the one or more portions of the data object reference by the annotation.

Another embodiment provides a computer-readable medium containing a program. When executed by a processor, the program performs operations including receiving, from a user, a request for an annotation for one or more portions of a data object, calculating a current change detection value for data extracted from the one or more portions in response to receiving the request, comparing the current change detection value to a previous change detection value calculated for data extracted from the one or more portions prior to receiving the request and, if the current and previous change detection values do not match, indicating to the user that the requested annotation is invalid due to a change in the one or more portions of the data object.

Another embodiment provides an annotation system. The annotation system generally includes an annotation database, an annotation generation component configured to generate an annotation for one or more portions of a data object, calculate at least a first change detection value on data extracted from the on one or more portions of the data object, create an annotation record containing the first change detection value and the generated annotation, and store the annotation record in the annotation database. The annotation system may also include an annotation validation component configured to calculate at least a second change detection value on data extracted from the one or more portions of the data object in response to receiving a request for the generated annotation from a user and compare the first and second change detection values to determine if the one or more portions of data have changed since creating the first change detection value.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
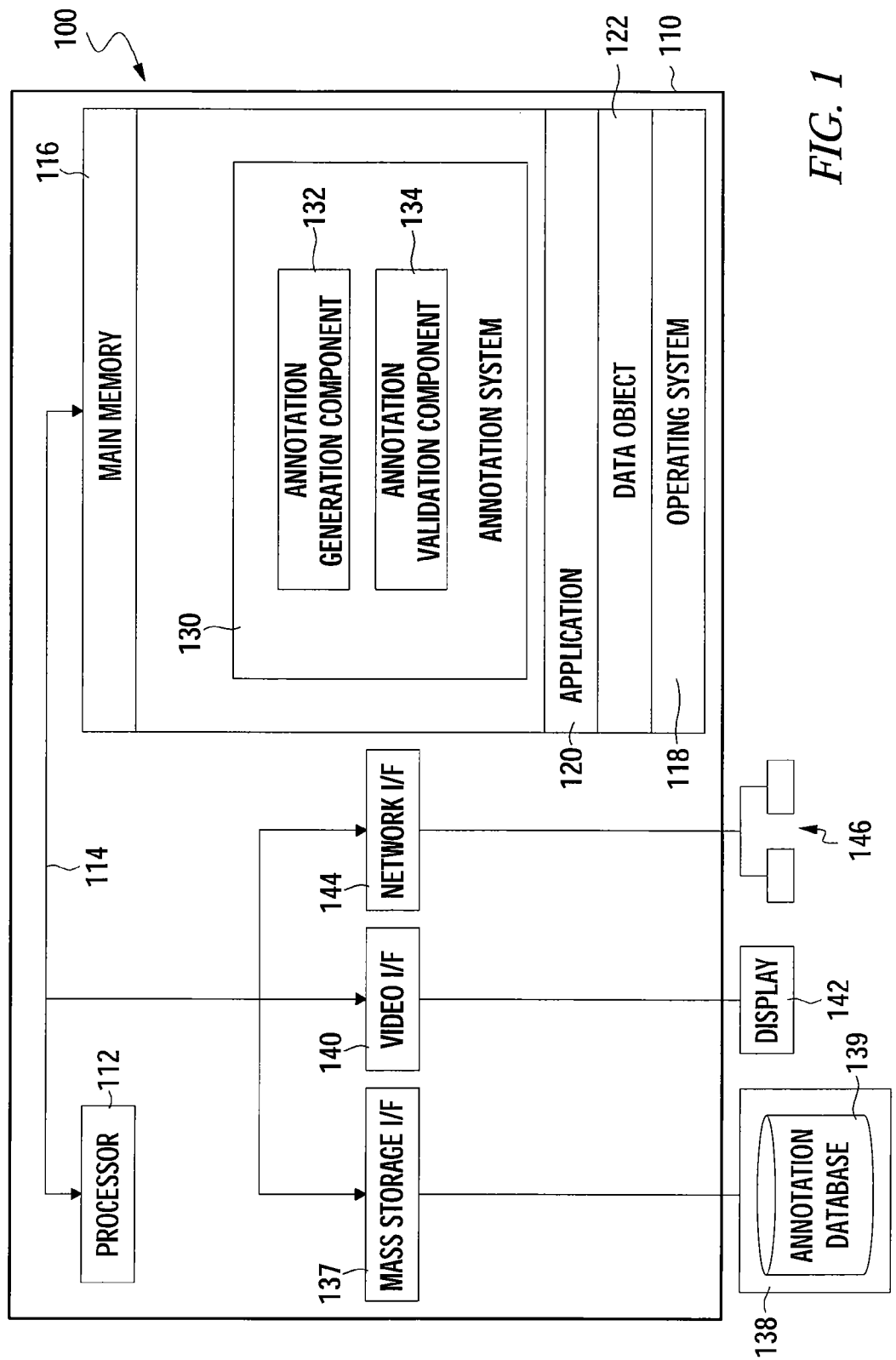
FIG. 1 is a computer system illustratively utilized in accordance with embodiments of the present invention.

The present invention provides methods, systems, and articles of manufacture for validating annotations generated for one or more portions of a data object. In general, an annotation for one or more portions of a data object is saved with a change detection value or set of change detection values "surgically" generated for just the annotated portions when the annotation is generated. Later, when the annotation is recalled, for example, in response to a request from a user, a new change detection value is generated for the annotated portions using current data, and compared against the previously saved change detection value. If the change detection values do not match, the user may be notified that the annotation may no longer be valid.

As used herein, the term annotation generally refers to any descriptive information associated with one or more portions of data. Annotations may exist in various forms, including textual annotations (descriptions, revisions, clarifications, comments, instructions, etc.), graphical annotations (pictures, symbols, etc.), sound clips, etc. As used herein, the term change detection value generally refers to any numerical, derived, or filtered value, regardless of length, generated by an algorithm performed on portions of data to encode, detect changes in, or validate completeness of the portions of data. Any suitable algorithm may be used to generate the change detection value, including, but not limited to, simple summing algorithms and more complex algorithms, such as cyclic redundancy check (CRC) algorithms and MD5 filtering functions commonly used to generate checksums. Further, a change detection value may be larger than the portions of data or the portions of data may be used as a change detection value. While a change detection value may be all of these, to facilitate understanding, embodiments of the present invention may be described with reference to a checksum as a particular, but not limiting, example of a change detection value. Accordingly, the following references to checksums may be applied to change detection values in general.

One embodiment of the invention is implemented as a program product for use with a computer system such as, for example, the computer system 110 of the data processing environment 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

Referring now to FIG. 1, the data processing environment 100 is shown. In general, the data processing environment 100 includes a computer system 110 and a plurality of networked devices 146. The computer system 110 may represent any type of computer, computer system or other programmable electronic device, including a client computer, a server computer, a portable computer, an embedded controller, a PC-based server, a minicomputer, a midrange computer, a mainframe computer, and other computers adapted to support the methods, apparatus, and article of manufacture of the invention. In one embodiment, the computer system 110 is an eServer iSeries 400 available from International Business Machines of Armonk, N.Y.

The computer system 110 could include a number of operators and peripheral systems as shown, for example, by a mass storage interface 137 operably connected to a direct access storage device (DASD) 138, by a video interface 140 operably connected to a display 142, and by a network interface 144 operably connected to the networked devices 146. The display 142 may be any video output device for outputting viewable information. The networked devices 146 may be any combination of any type networked devices, such as networked servers, networked printers, and network accessed storage (NAS) devices.

Computer system 110 is shown comprising at least one processor 112, which obtains instructions and data via a bus 114 from a main memory 116. The processor 112 could be any processor adapted to support the methods of the invention. The main memory 116 is any memory sufficiently large to hold the necessary programs and data structures. Main memory 116 could be one or a combination of memory devices, including Random Access Memory, nonvolatile or backup memory, (e.g., programmable or Flash memories, read-only memories, etc.). In addition, memory 116 may be considered to include memory physically located elsewhere in a computer system 110, for example, any storage capacity used as virtual memory or stored on a mass storage device (e.g., DASD 138) or on another computer coupled to the computer system 110 via bus 114.

The memory 116 is shown configured with an operating system 118. The operating system 118 is the software used for managing the operation of the computer system 110. Examples of the operating system 118 include UNIX, Microsoft Windows®, and the like. The memory 116 further includes at least one application 120 and an annotation system 130.

The application 120 and the annotation system 130 are software products comprising a plurality of instructions that are resident at various times in various memory and storage devices in the computer system 110. When read and executed by one or more processors 112 in the computer system 110, the application 120 and the annotation system 130 cause the computer system 110 to perform the steps necessary to execute steps or elements embodying the various aspects of the invention. The application 120 is generally configured to access (i.e., generate, edit, modify, display, etc.) a data object 122. The data object 122 may be any type data object, such as a text document, a spreadsheet, a multimedia file, or a subcomponent thereof.

The annotation system 130 is generally configured to generate annotations for an entire portion of the data object 122 or subportions of the data object 122, and validate the generated annotations by detecting changes made to the annotated portions of the data object 122 after generating the annotations. The generated annotations may be stored in an annotation database 139, for example, in the DASD 138. While illustrated as separate from the application 120, for some embodiments, the annotation system 130 may be an integral part of the application 120. Regardless, as illustrated, the annotation system 130 may include various software components, such as an annotation generation component 132 and an annotation validation component 134.

Figure 2A:
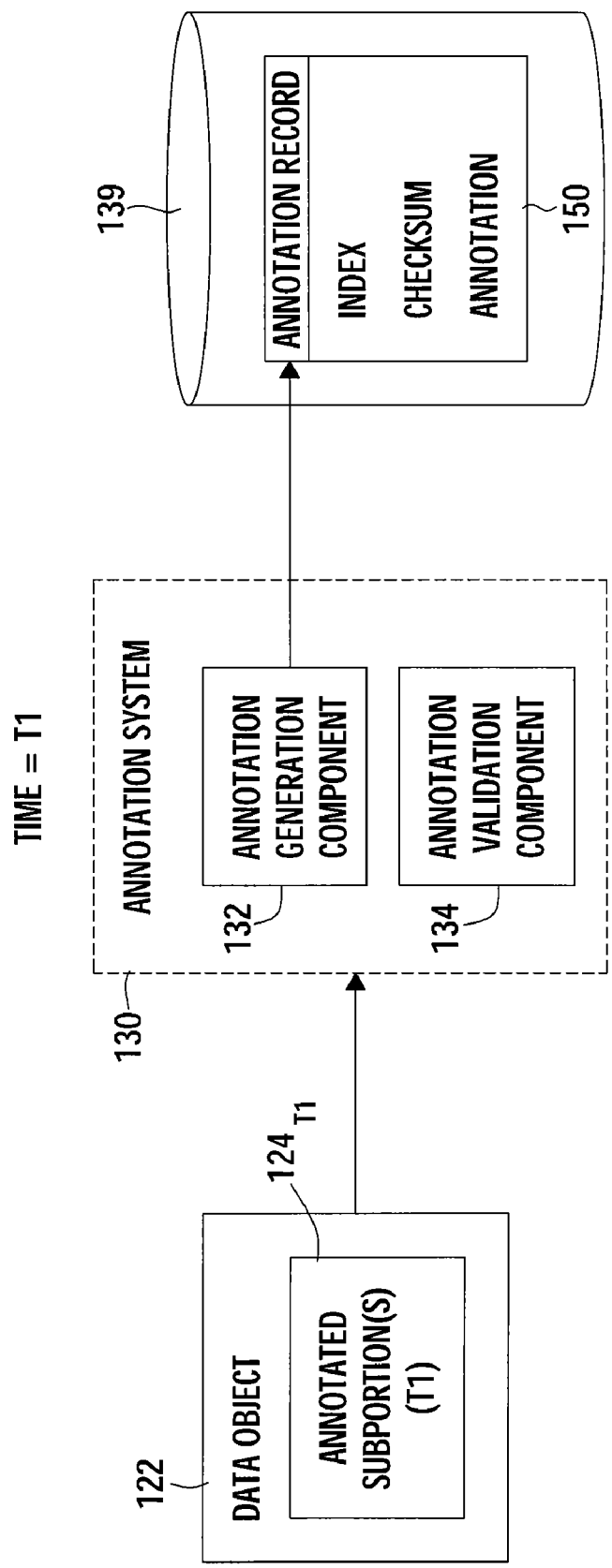
FIGS. 2A and 2B are relational views of software components according to one embodiment of the present invention.
Figure 2B:
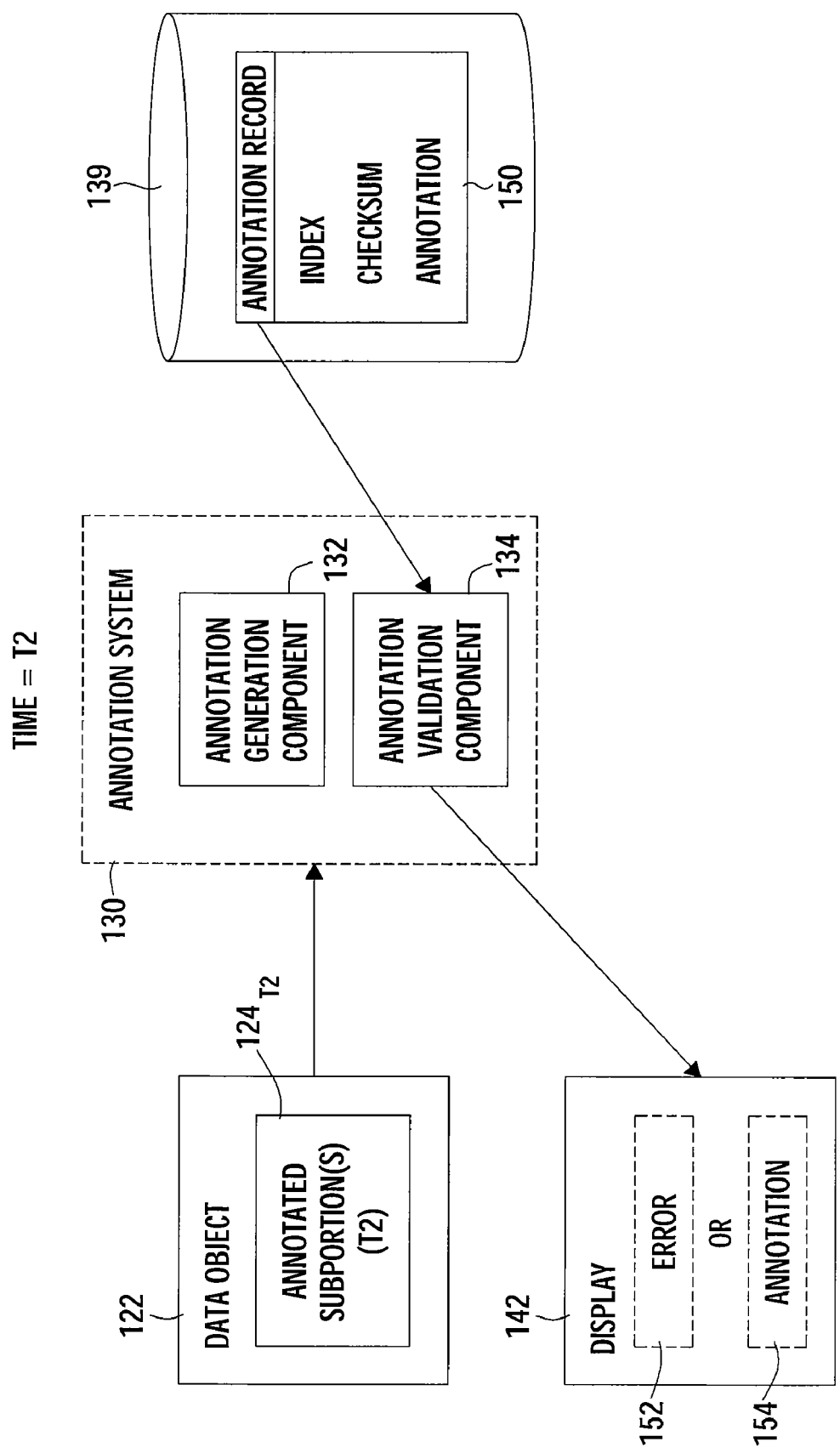

FIGS. 2A and 2B illustrate relational views of the annotation generation component 132 and the annotation validation component 134, during annotation generation (at a time T1) and annotation validation (at a later time T2), respectively. As illustrated, the annotation generation component 132 may generate an annotation record 150 containing an annotation, an index to one or more annotated portions 124 of the data object 122 described by the annotation, and a checksum for the annotated portions 124. Because the annotation portions 124 of the data object 122 may change from T1 to T2, separate reference numbers $124_{T1}$ and $124_{T2}$ are used when specifically refer to the annotated portions 124 at times T1 and T2, respectively.

Annotation Generation

Figure 3:
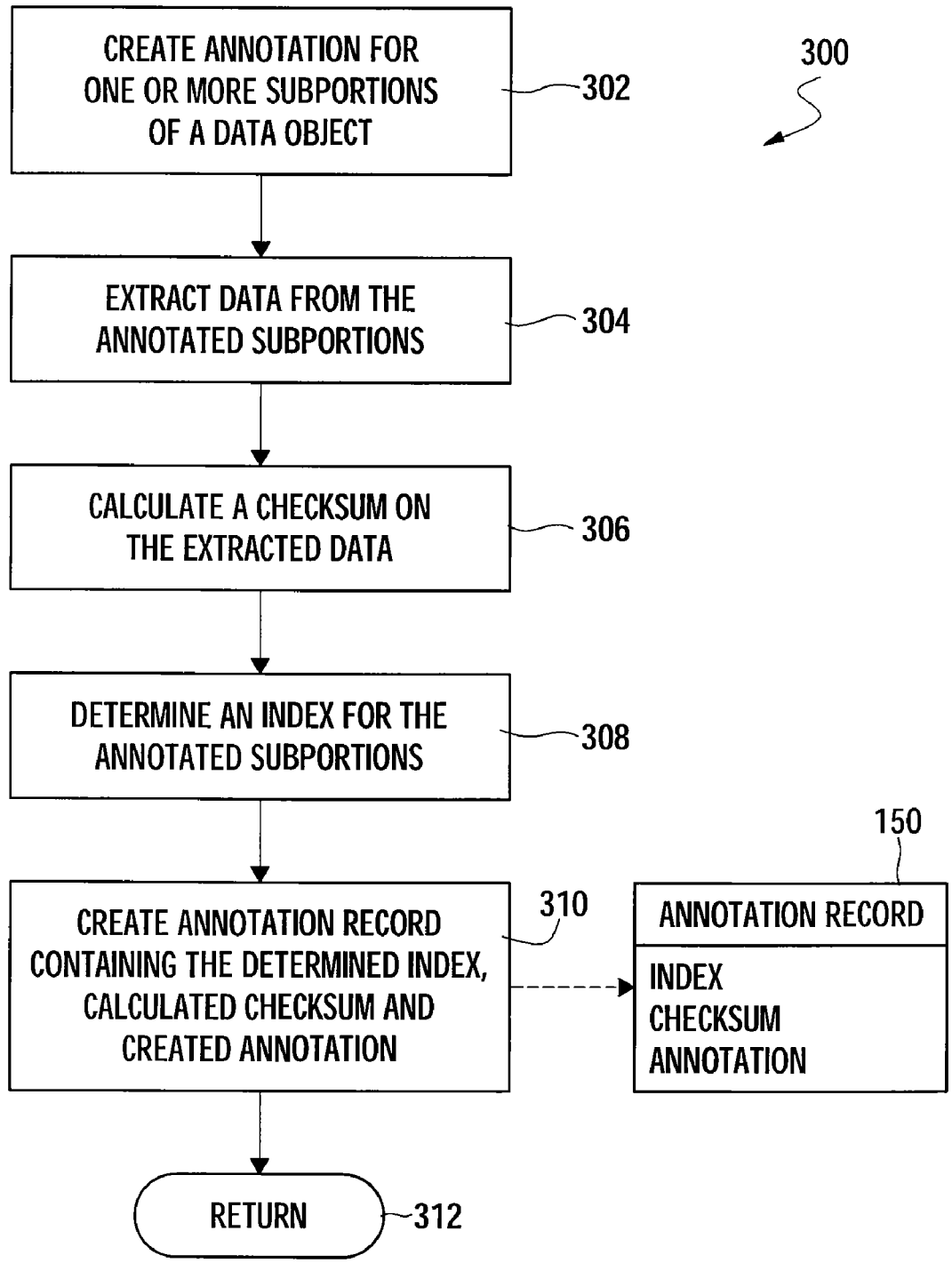
FIG. 3 is a flow chart illustrating operations of the annotation generation component of FIG. 2A according to one embodiment of the present invention.

The operation of the annotation generation component 132 may be described with reference to FIG. 2A and FIG. 3, which illustrates exemplary operations 300 that may be performed by the annotation generation component 132. For example, the operations 300 may comprise an annotation generation subroutine called by the annotation system 130 or an external application.

The method 300 begins at step 302 by creating an annotation for one or more subportions of a data object. For example, a user may generate an annotation for subportions $124_{T1}$, of the data object 122. As previously described, the annotation may be any suitable type annotation (e.g., textual, graphical, etc.). Further, the user may generate the annotation using any suitable means for generating the annotation, such as a graphical user interface (GUI), command line interface, or batch process, which may or may not be an integral part of the annotation generation component 132. As an alternative, the annotation may be generated by a non-human user, such as an application program configured to automatically generate annotations, for example, in response to detecting certain data correlations or conditions in the data object. The annotated subportions may also be selected using any suitable technique, such as selecting the annotated subportions with an input device (e.g., a mouse), selecting the annotated subportions with a graphical user interface, or manually specifying the annotated subportions.

At step 304, data is extracted from the annotated subportions $124_{T1}$ and, at step 306, a checksum is calculated on the extracted data. As previously described, any suitable algorithm may be used to generate the checksum from the extracted data. Further, the one or more annotated subportions 124 may comprise a single, continuous portion of the data object 122 or may comprise a plurality of discontinuous portions of the data object 122.

At step 308, an index is determined for the annotated subportions $124_{T1}$. In general, the index comprises a set of referential values that allows the annotation system 130 to locate the annotated subportions of the data object 122. In other words, the index may include a location (e.g., a directory or network location, file name, etc.) of the data object 122 and the location of the annotated subportions $124_{T1}$ within the data object 122. As will be described in greater detail below, the location of the annotated subportions $124_{T1}$ within the data object 122 may be specified by one or more sets of values (e.g., a paragraph number, a data point, a set or range of data points, etc.).

At step 310, an annotation record 150 is created containing the determined index, calculated checksum, and the created annotation. As illustrated, the annotation generation component may store the annotation record 150 in the annotation database 139, for later retrieval and use during an annotation validation routine. For some embodiments, the annotation record 150 may also include additional information that may be used by the annotation system 130, such as a type of the data object 122 (e.g., a text document, spreadsheet, etc.), who generated the annotation, a classification of the annotation (instructions, corrections, general descriptions, etc.). This additional information may allow a user to search the annotation database for specific annotations. The operations 300 cease at step 312, for example, by returning from the subroutine.

Figure 4:
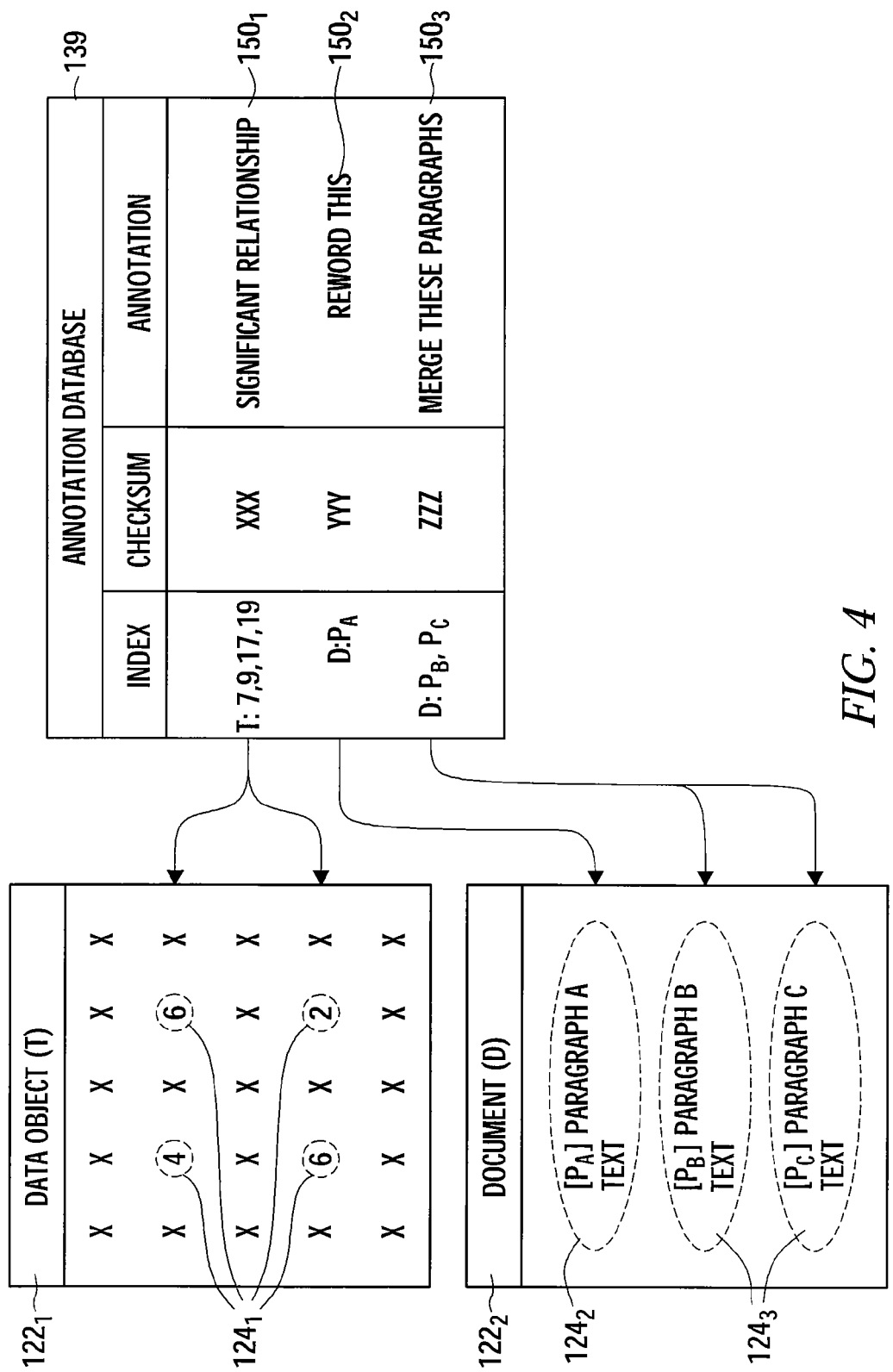
FIG. 4 is a relational view illustrating an exemplary annotation database and annotated data objects according to one embodiment of the present invention.

The technique used to calculate the checksum (at step 306), as well as the form of annotation records 150 generated by the annotation generation component 132 may depend on the format of the annotated subportions 124. For example, FIG. 4 shows an exemplary annotation database 139 holding annotation records $150_1$, $150_2$, and $150_3$ for three different types of annotated subportions $124_1$, $124_2$, and $124_3$, respectively.

As illustrated, the annotation record $150_1$ contains an annotation ("SIGNIFICANT RELATIONSHIP") describing the subportions $124_1$, which include 4 discontinuous elements of the data object $122_1$ (counting from the upper left corner, elements 7, 9, 17, and 19) comprising an array of data. Accordingly, the index for the record $150_1$ includes 4 separate reference values indicating the location, within the data object $122_1$, of the discontinuous subportions $124_1$. As illustrated, the index may also include a name parameter, indicating, for example, the location of the data object $122_1$ (illustratively a data table with a name 'T'). For example, while not illustrated, the name parameter may include network and/or directory information for the data object $122_1$. To calculate a checksum (indicated as XXX), the discontinuous subportions $124_1$ may be first assembled into a buffer and the checksum may be calculated from the continuous data in the buffer. As another alternative, if the annotated portions are small enough (e.g., less total bytes than the checksum), actual data from the annotated portions may be stored in place of a checksum. Of course, if the annotated subportions 124 comprised continuous data elements, the index of the corresponding record 150 may specify the range of the continuous data, for example by specifying two points defining the range, or a single (starting) point and a length.

The annotation record $150_2$ contains an annotation ("REWORD THIS") requesting revision to a subportion $124_2$ of a data object $122_2$ (illustratively, a document 'D'). The subportion $124_2$ comprises a paragraph (paragraph A). Accordingly, the checksum (YYY) of the record $150_2$ may be calculated on the text of the paragraph A. The annotation record $150_3$, however, contains an annotation ("MERGE THESE PARAGRAPHS") requesting revision to a subportion $124_3$ of the data object $122_2$, comprising two paragraphs (paragraphs B and C). Accordingly, the checksum (ZZZ) of the annotation record $150_3$ may be calculated using a variety of different techniques.

For example, if the paragraphs B and C are continuous, the checksum may be calculated on the continuous text of the two paragraphs. On the other hand, if the paragraphs B and C are discontinuous, the text from the two paragraphs may be loaded into a buffer (as described above), and the checksum may be calculated on the contents of the buffer. Alternatively, (regardless of whether the paragraphs are continuous or not) a checksum may be calculated for each paragraph. The checksum for each paragraph may be saved in the annotation record $150_3$, the checksums may be combined (summed) into a single checksum, or a single checksum may be calculated on the individual checksums. Of course, similar techniques for calculating, combining, or storing more than one checksum may be utilized on any type of continuous or discontinuous annotated subportions, not just paragraphs. For some embodiments, the annotated subportions may even comprise other annotations.

Annotation Validation

Figure 5:
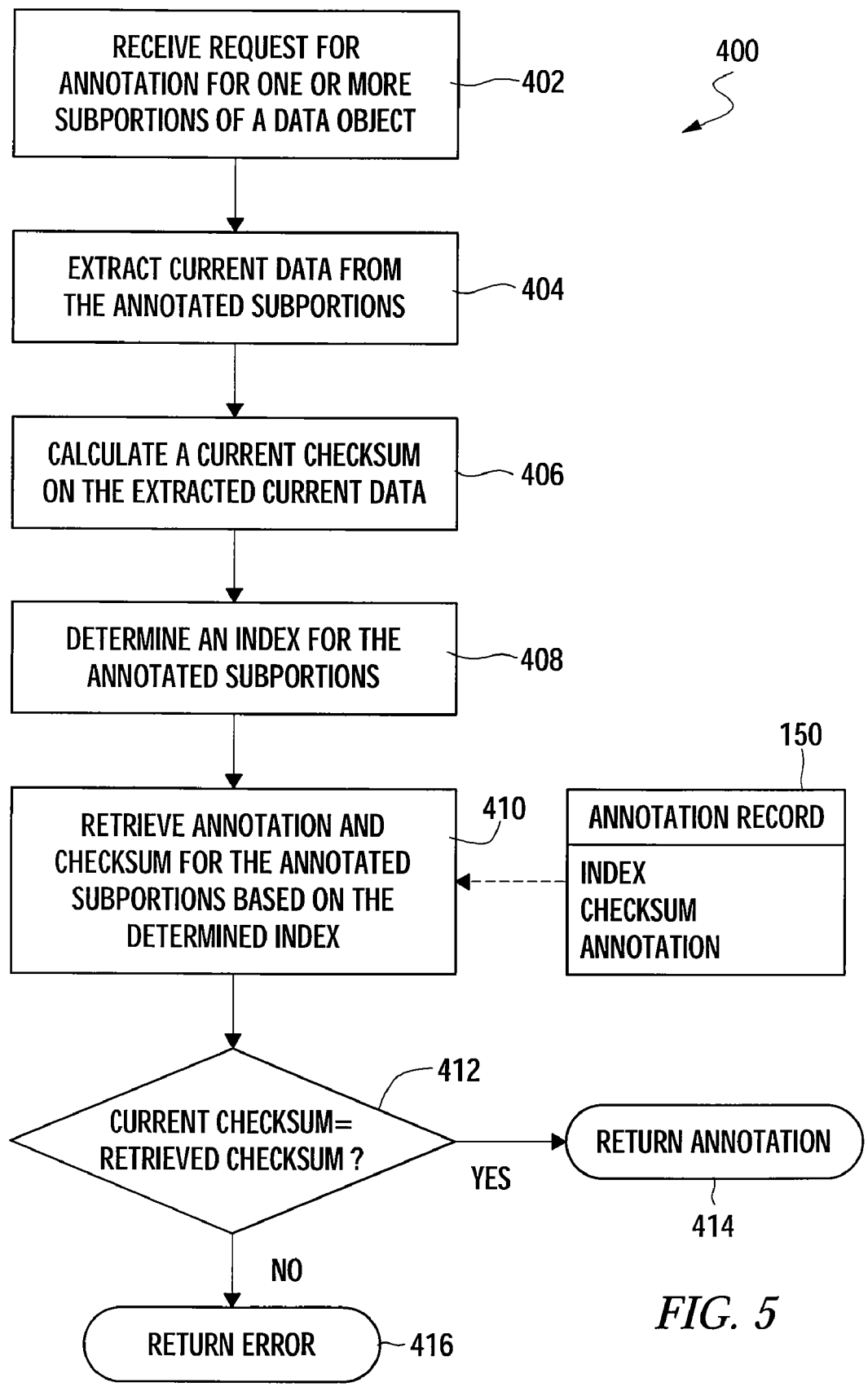
FIG. 5 is a flow chart illustrating operations of the annotation validation component of FIG. 2B according to one embodiment of the present invention.

Referring back to FIG. 2B, at a time T2 the annotation validation component 134 may access the annotation record 150 in order to determine if the annotated subportions $124_{T2}$ have changed since the annotation was generated at time T1. The operation of the annotation validation component 134 may be described with reference to FIG. 2B and FIG. 5, which illustrates exemplary operations 400 that may be performed by the annotation generation component 134.

For example, the operations 400 may comprise an annotation validation subroutine called by the annotation system 130, in response to receiving a request, at step 402, for an annotation for one or more subportions of a data object 122. The request for the annotation may come from a user or an external application. For example, the request may come as the result of a user opening the data object (e.g., a document) and requesting, from the annotation system, any annotations for the data object. As another example, the request may result from a user directly querying the annotation database 139. For example, the user may query the annotation database 139 to find any annotations containing a certain text string, annotations created by a particular person, or annotations specifying or containing corrections to be made to the data object.

Regardless, at step 404, current data is extracted from the annotated subportions ($124_{T2}$) of the data object 122 and, at step 406, a current checksum is calculated on the extracted current data. At step 408, an index is determined for the annotated subportions, and at step 410, the requested annotation and saved checksum for the annotated subportions are retrieved. For example, the annotation system validation component 134 may search the annotation database 139 for the annotation record 150 of the requested annotation based on the determined index.

At step 412, the current checksum (calculated at step 406) is compared to the retrieved checksum. If the current checksum and received checksum match, the annotated subportions have not changed since the requested annotation was generated, indicating the requested annotation is still valid. Accordingly, the requested annotation is returned at step 414. On the other hand, if the current checksum and received checksum do not match, the annotated subportions have changed since the requested annotation was generated and the requested annotation is invalid. Accordingly, an error is returned, at step 416.

Of course, for various implementations, or at different times within the same implementation, the order of the operations 400 may vary. For example, the index may be determined for the annotated subportions (step 408) prior to extracting current data from the annotated subportions (step 404). As another example, the requested annotation and associated saved checksum may be retrieved (step 410) prior to calculating a current checksum at step 406. As previously described, depending on the format of the annotated portions 124 of the data object 122, more than one checksum may be calculated, combined, or stored for each annotated subportion 124. Further, for some embodiments, the annotation validation component 134 may be configured to perform the validation operations (steps 402-416) automatically, for example, while a user is editing the data object 122, or periodically, to monitor the validity of annotations. In such cases, the annotations may be accessed first. Therefore, rather than retrieve the annotation and checksum (step 410) based on the index, the index may be retrieved from the annotation record in order to locate the proper data to extract.

As illustrated in FIG. 2B, depending on a specific implementation of the annotation system 130 (or application requesting the annotation), when a change is detected in the annotated subportions 124, an error message may be displayed on the display 142. For some embodiments, if the annotated subportions 124 of the data object 122 have changed, the requested annotation may still be displayed (e.g., in a flyover text box, separate window, etc.). However, an indication may be provided that the displayed annotation is suspect (possibly invalid) due to a change in the annotated subportions of the data object 122 since the annotation was generated. For example, the indication may comprise a change in appearance of the annotation or related text (e.g., relative to the appearance of valid annotations or related text), or the addition, absence, or change of a graphical icon. For some embodiments, the annotation may be accessed by another application. Therefore, an indicator may be provided (e.g., a data flag may be set or cleared, a register set to a certain value, an exception thrown, an error code returned, etc.) to provide an indication to the application of the validity of the annotation.

Figure 6:
FIG. 6 illustrates a graphical user interface (GUI) screen for notifying a user of annotation invalidity according to one embodiment of the present invention.

For some embodiments, upon determining the annotated data has changed, a user may be presented with options for reconciling the annotation with the changed data. For example, the user may be presented with a list of options in a GUI screen, such as the GUI screen 600 shown in FIG. 6. As illustrated, the user may have the option of updating the annotation record to reflect the current data (i.e., as changed), editing the annotation, or deleting the annotation. For example, the user may choose to update the annotation record to reflect the current data if the annotation is still accurate (valid) in light of the changed data. The annotation record 150 may then be updated with the checksum calculated on the current data extracted from the changed annotated subportions, thus preventing future error messages (at least until the data changes again).

If, on the other hand, the annotation is inaccurate (invalid), or possibly not as descriptive as it could be, in light of the changes to the annotated data, the user may choose to edit the annotation accordingly. For example, a user choosing this option may be presented with another GUI screen presenting the annotation and allowing the user to edit the annotation. Finally, if the changes to the annotated data render the annotation unnecessary, the user may choose to delete the annotation entirely. For example, if errors have been corrected or suggested revisions have been made, deleting the annotation is appropriate.

CONCLUSION

By comparing a current checksum, calculated for one or more annotated portions of a data object described by an annotation, to a previously saved checksum, calculated for the annotated portions when the annotation was generated, changes in the annotated portions may be detected. Thus, validity of the annotation may be determined. By surgically calculating the checksums for just the annotated portions of the data object, changes may be made to other portions of the data object without affecting the determined validity of the annotation. Further, in response to detecting a change in the annotated data, a user may be provided with an interface allowing the user to easily reconcile the annotation with the changed data (e.g., by accepting the changes, editing or deleting the annotation).

While the foregoing is directed to embodiments of the present invention, other and further embodiments of the invention may be devised without departing from the basic scope thereof, and the scope thereof is determined by the claims that follow.

What is claimed is:

1. A non-transitory computer-readable medium containing a program which, when executed by a processor, performs operations comprising:
   receiving, from a user, a request for an annotation for one or more portions of a data object;
   prior to receiving the request for the annotation:
      creating the requested annotation;
      calculating a previous change detection value; and
      creating an annotation record containing at least an index to the one or more portions, the previous change detection value, and the requested annotation;
   calculating a current change detection value for data extracted from the one or more portions in response to receiving the request;
   comparing the current change detection value to the previous change detection value calculated for data extracted from the one or more portions prior to receiving the request; and
   upon determining that the current change detection value and the previous change detection value do not match, indicating to the user that the requested annotation is invalid due to a change in the one or more portions of the data object by generating a message that provides the user with the option of overwriting the previous change detection value with the current change detection value.

2. The computer-readable medium of claim 1, wherein the operations further comprise providing the user with options comprising at least one of:
   editing the annotation;
   overwriting the previous change detection value with the current change detection value to reflect the change in the one or more portions of the data object; and
   deleting the annotation.

3. The computer-readable medium of claim 1, wherein the one or more portions of the data object comprise discontinuous portions.

4. The computer-readable medium of claim 3, further comprising:
   extracting data from the one or more portions of the data object to a buffer; and
   calculating the change detection value on the data extracted to the buffer.

5. The computer-readable medium of claim 1, further comprising storing the annotation record in an annotation database.

6. An annotation system, comprising:
   a processor; and
   a memory, comprising:
      an annotation database;
      an annotation generation component which, when executed by the processor, is configured to generate an annotation for one or more portions of a data object, calculate at least a first change detection value on data extracted from the on one or more portions of the data object, create an annotation record containing the first change detection value and the generated annotation, and store the annotation record in the annotation database; and an annotation validation component which, when executed by the processor, is configured to calculate at least a second change detection value on data extracted from the one or more portions of the data object in response to receiving a request for the generated annotation from a user, compare the first and second change detection values, and provide an indication to the user that the one or more portions of the data object have changed if the first and second change detection values do not match by generating a message, and wherein the annotation validation component is further configured to provide the user with the option of overwriting the first change detection value with the second change detection value.

7. The annotation system of claim 6, wherein the one or more portions of the data object comprise discontinuous data elements.

8. The annotation system of claim 6, wherein the annotation generation component and the annotation validation component are configured to calculate change detection values for each of the one or more portions of the data object.

9. The annotation system of claim 6, wherein the generated message includes the requested annotation.

10. The annotation system of claim 6, wherein the annotation validation component is further configured to provide the user with the options of editing or deleting the requested annotation.

11. A method for determining validity of annotations, comprising:
  (a) providing a plurality of annotations of a data object containing a plurality of annotated portions, each annotated portion being referenced by one of the plurality of annotations, wherein the plurality of annotated portions includes at least two discontinuous portions; and
  (b) for each annotation of the data object:
    (i) calculating, by operation of one or more computer processors, a current change detection value for data in a respective annotated portion of the data object referenced by the annotation;
    (ii) comparing the current change detection value to a previous change detection value calculated for data in the annotated portion referenced by the annotation; and
    (iii) upon determining that the current change detection value and the previous change detection value do not match, providing an indication that the annotation is possibly invalid due to a change in data in the annotated portion object by generating a message that provides the user with the option of overwriting the previous change detection value with the current change detection value.

12. The method of claim 11, wherein providing an indication that the annotation is possibly invalid due to a change in data comprises displaying the annotated portion referenced by the annotation and providing an indication that the annotated portion referenced by the annotation has changed.

13. The method of claim 12, wherein providing an indication that the annotated portion referenced by the annotation has changed comprises at least one of:
  changing an appearance of the displayed annotated portion referenced by the annotation; and
  adding, removing, or changing a graphical icon.

14. A method for determining validity of annotations in a data object, comprising:
  (a) calculating, by operation of one or more computer processors, a single current change detection value for data in a plurality of annotated portions of the data object, wherein each of the annotated portions is referenced by a different annotation selected from a plurality of annotations, and wherein the single current change detection value is calculated only for the annotated portions of the data object, and wherein the plurality of annotated portions contains at least two discontinuous portions;
  (b) comparing the single current change detection value to a previous change detection value calculated for data in the plurality of annotated portions of the data object; and
  (c) upon determining that the single current change detection value and the previous change detection value do not match, providing an indication that at least one of the annotations in the data object is possibly invalid due to a change in data in the plurality of annotated portions object by generating a message that provides the user with the option of overwriting the previous change detection value with the single current change detection value.

15. The method of claim 14, wherein the data object contains at least one unannotated portion, and wherein the calculated single current change detection value is not calculated for the at least one unannotated portion of the data object.

16. The method of claim 14, wherein providing an indication that the at least one of the annotations in the data object is possibly invalid due to a change in data comprises:
  displaying at least one annotated portion referenced by the at least one of the annotations; and
  providing an indication that the at least one annotated portion has changed.

17. The method of claim 16, wherein providing an indication that the at least one annotated portion has changed comprises at least one of:
  changing an appearance of the displayed annotated portion referenced by the annotation; and
  one or more of adding, removing, or changing a graphical icon.

* * * * *